United States Patent [19]

Alexander et al.

[11] 3,842,667

[45] Oct. 22, 1974

[54] DISPLACEMENT INDICATOR MEANS FOR COIL SPRINGS

[75] Inventors: Carl J. Alexander, Moore Park; Robert J. Boudeman, Hickory Corners, both of Mich.

[73] Assignee: Wells Manufacturing Corporation, Three Rivers, Mich.

[22] Filed: Sept. 24, 1973

[21] Appl. No.: 400,265

[52] U.S. Cl. ............... 73/141 AB, 83/802, 177/208
[51] Int. Cl. .............................................. G01l 1/04
[58] Field of Search ........ 73/141 AB, 143; 177/208; 83/802

[56] References Cited
UNITED STATES PATENTS
2,372,704  4/1945  Bennett .......................... 73/141 AB Primary Examiner—Jerry W. Myracle
Attorney, Agent, or Firm—Talivaldis Cepuritis

[57] ABSTRACT

Means indicating displacement of a coil spring comprises a flexible tube having one closed end and partially filled with a liquid forming a meniscus in the tube. The liquid-containing portion of the tube is coiled between adjacent convolutions of the spring and in an abutting relationship therewith.

A scale means is provided adjacent to the meniscus in said tube for determining change in position of the meniscus as the spring is compressed or extended.

12 Claims, 6 Drawing Figures

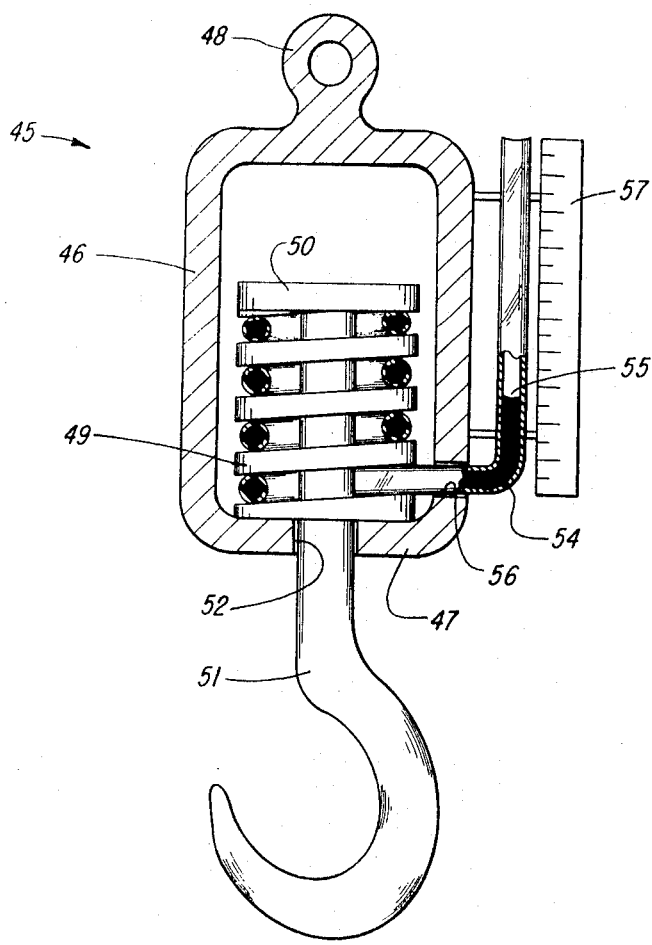
figure 4
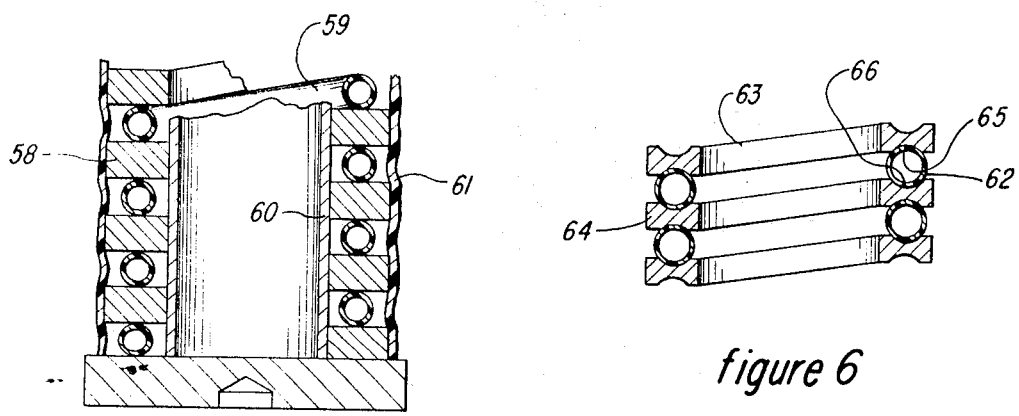
figure 5
figure 6

DISPLACEMENT INDICATOR MEANS FOR COIL SPRINGS

BACKGROUND OF THE INVENTION

This invention relates to means for determining displacement of coil springs.

Coil springs are frequently utilized in load-bearing applications. In many instances it is desirable to ascertain at any given instance the load or external force to which a coil spring is subjected. Typical of such instances are spring-type weighing devices, band saw blade tensioning means, safety releases on crane booms, and the like.

Within its proportional limit, a coil spring which is acted upon by external forces will deform in proportion to the stress developed, in accordance with Hooke's Law. However, depending on the load carrying capacity of the spring and the particular external force acting upon the spring, the deformation or displacement of the spring from an equilibrium position may not be sufficiently large for easy measurement with accuracy. Moreover, the location of the spring within a particular machine may be such as to make direct measurement of spring displacement difficult or impossible.

It is an object of this invention to provide a displacement indicator means for coil springs whereby even relatively small displacements can be ascertained with accuracy.

It is a further object of the present invention to provide a displacement indicator means having a remote readout capability.

Still other objects of this invention will readily present themselves to one skilled in the art upon reference to the ensuing specification, the drawings and the claims.

SUMMARY OF THE INVENTION

The present invention contemplates a combination of a coil spring having a plurality of convolutions with a displacement indicator means which comprises a liquid-containing flexible tube between adjacent convolutions of the spring and in an abutting relationship therewith. Liquid in said tube fills at least a portion of the flexible tube between the spring convolutions and forms a meniscus at some point along the length of the tube.

A scale means is mounted adjacent to the meniscus for determining change in position of the meniscus in response to a change in spacing between adjacent convolutions of the spring. The flexible tube is closed at one end, and preferably has a substantially uniform bore.

BRIEF DESCRIPTION OF THE DRAWINGS

In the drawings,

FIG. 4 is a sectional view in elevation showing a suspension-type weighing device embodying this invention;

FIG. 5 is a fragmentary sectional view showing yet another embodiment of the present invention; and FIG. 6 is another fragmentary sectional view of this invention illustrating a still further embodiment thereof.

DESCRIPTION OF THE PREFERRED EMBODIMENTS

Figure 1:
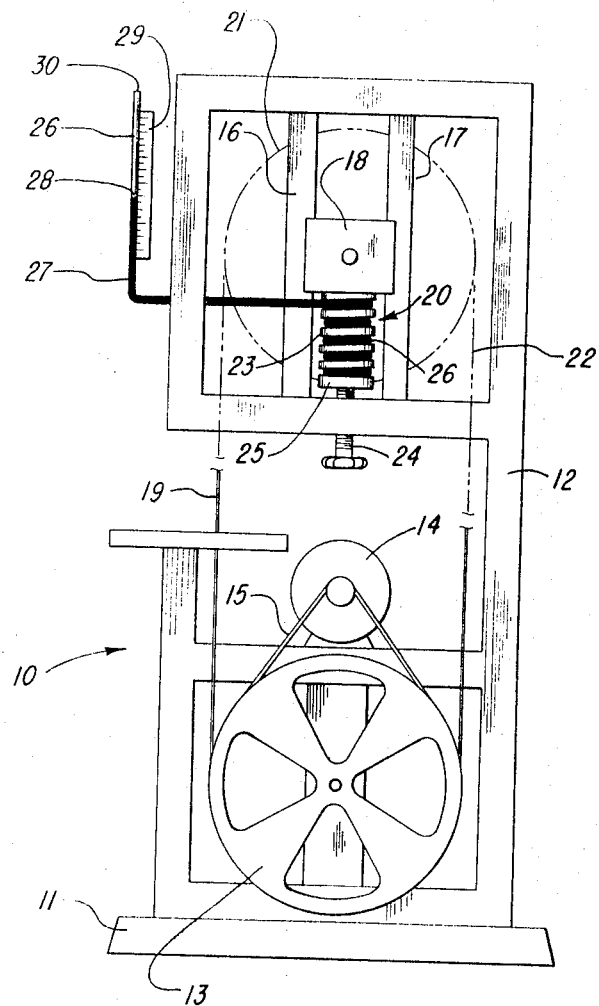
FIG. 1 is an elevational view of a band saw embodying the present invention, some band saw parts having been removed to show interior detail.
Figure 2:
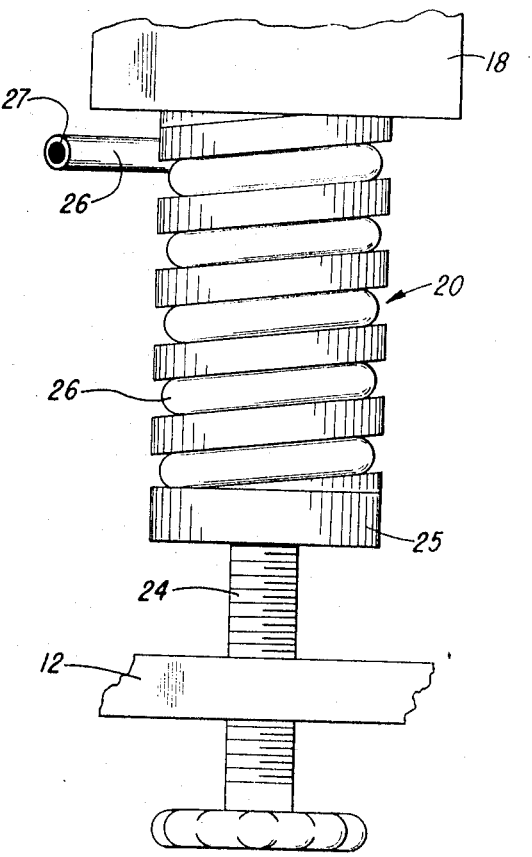
FIG. 2 is a fragmentary elevational view showing an embodiment of this invention.

Referring to FIGS. 1 and 2, band saw 10 comprises base plate 11 to which is connected upwardly extending support frame 12. Blade drive wheel is rotatably mounted on support frame 12 and is driven by electric motor 14 or the like by means of belt 15.

Spaced guides 16 and 17 are integral with support frame 12 and mounting block 18 is slidably received therebetween. An idler wheel for endless band saw blade 19 is rotatably mounted on block 18. In FIG. 1 this idler wheel has been removed in order to show displacement indicator means 20, however, the general configuration and location of the idler wheel is designated by outline 21. Blade path for endless band saw blade 19 near the idler wheel is designated by legend 22.

Coiled compression spring 23 having a plurality of convolutions and mounted on support frame 12 by means of adjustment screw 24 and pad 25 abuts mounting block 18 and serves to space the idler wheel from drive wheel 13 at a distance sufficient to subject band saw blade 19 to the desired tension. Adjustment screw 24 threadedly engages support frame 12 and urges compression spring 23 against block 18.

Flexible tube 26, closed at one end, is situated between adjacent convolutions of spring 23 and contains liquid 27 which fills at least a portion of tube 26 situated between the convolutions and which forms meniscus 28. As spring 23 is compressed, the spacing between adjacent convolutions is decreased and flexible tube 26 is also compressed. As a result, a portion of liquid 27 is displaced and the position of meniscus 28 in tube 26 is changed. Inasmuch as a position change of meniscus 28 is proportional to the degree of displacement of spring 26, which in turn is proportional to an external force acting on spring 26, the position change of meniscus 28 can be utilized as a remote indicator of the force acting on spring 26. To facilitate determination of the position change by meniscus 28, scale 29 is mounted adjacent thereto. After an initial calibration of blade tension for band saw blades of different widths, such band saw blades can be readily interchanged or replaced, and subsequently tensioned, using displacement indicator means 20 of the present invention.

Free end 30 of flexible tube 26 can be open or can be covered with a relatively elastic capping means, e.g., a balloon-type cap or a bellows-type cap which permits a ready movement of meniscus 28 within tube 26 without an attendant variation in pressure in that portion of tube 26 which does not contain any liquid. Preferably liquid 27 contains some coloring so that the exact position of meniscus 28 is readily ascertainable. While the position of meniscus 28 within flexible tube 26 can be ascertained by several means, e.g., visual inspection, conductivity, permeability to radiation, or the like, preferably at least that portion of flexible tube 26 within which meniscus 28 normally travels is transparent to permit a visual determination of meniscus position.

In instances where the liquid only fills a part of the flexible tube portion situated between the convolutions of a spring and where a visual inspection of such a spring is not obstructed by other machine elements that may be present, the scale means for determining meniscus' position change can be engraved directly on the spring, if desired.

Figure 3:
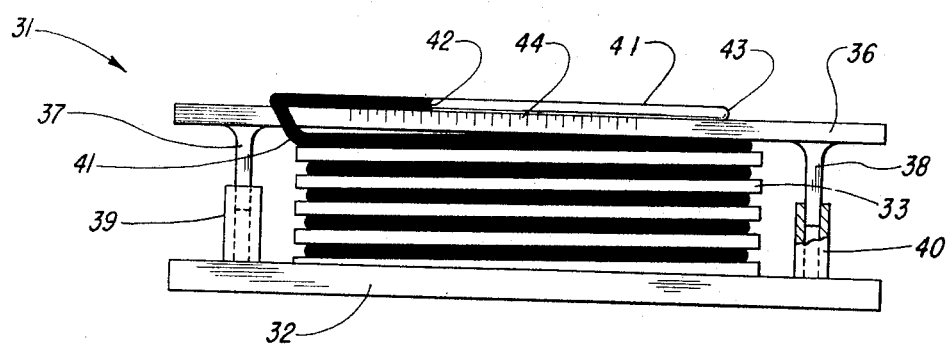
FIG. 3 is an elevational view of a platform-type weighing device embodying this invention.

Another embodiment of the spring displacement indicator means of this invention is shown in FIG. 3. Weighing device 31 comprises base plate 32, coiled compression spring 33 in a substantially upright, vertical position on base plate 32 and supporting platform 36. Platform 36 is provided with three downwardly depending leg members such as members 37 and 38 which are spaced about 120° apart and are slidably tubular guides on base 32 such as guide 39 for leg member 37 and guide 40 for leg member 38. At least three leg members are desirable in order to stabilize platform 36. Transparent flexible tube 41 having a readily expandable balloon-type end 43 is partially filled with a contrasting liquid which forms meniscus 42. The liquid-filled end of flexible tube 41 is situated between the convolutions of spring 33 and that portion of tube 41 containing meniscus 42 is mounted on platform 36. Scale means 44 is engraved on platform 36 adjacent to flexible tube 41 and meniscus 42. Any weight placed on platform 36 urges compression spring 33 against base plate 32 and causes meniscus 42 to shift laterally in tube 41. The extent of lateral shift is proportional to the weight placed on platform 36. After calibration of scale 44, weighing device 31 is ready for use.

Yet another weighing device is shown in FIG. 4. Spring-actuated weighing device 45 comprises housing 46 which is integral with base plate 47 and is provided with suspending means such as eye 48. Upstanding compression spring 49 is situated within housing 46 and rests on base plate 47. Disk 50 abuts upper end of compression spring 49, and is integrally connected to hook 51 which depends downwardly from disk 50 along the longitudinal axis of spring 49 and extends through opening 52 in base plate 47.

Transparent flexible tube 53, closed at one end and filled with liquid 54 which forms meniscus 55, is situated between adjacent convolutions of spring 49 and in contact therewith. The portion of tube 53 containing meniscus 55 extends through housing 46 through side opening 56 and is mounted in an upright position contiguous with housing 46. Scale means 57 is mounted on housing 46 adjacent to meniscus 55.

In the foregoing embodiments of the present invention, the spring convolutions preferably have a substantially rectangular cross-section as shown in FIG. 5 for spring 59. Moreover, in order to prevent flexible tube 59 from shifting out from between adjacent convolutions of spring 58, inner boot 60 and/or outer boot 61 can be provided. Boots 60 and 61 can be rigid, flexible or telescoping, as desired, as long as no interference with the normal movement of spring 58 is caused.

Flexible tube such as tube 62 in FIG. 6 can also be retained between adjacent convolutions such as 63 and 64 by providing grooves 65 and 66 therein which receives tube 62.

The foregoing description and the drawings are illustrative and are not to be taken as limiting. Still other variations and rearrangements of parts are possible without departing from the spirit and scope of this invention.

I claim:

1. In combination with a coiled spring having a plurality of convolutions, a displacement indicator means for said spring which comprises a flexible tube closed at one end, situated between adjacent convolutions of said spring and in an abutting relationship therewith; a liquid in said flexible tube, filling at least a portion of said flexible tube between said convolutions and forming a meniscus; and a scale means mounted adjacent to said meniscus for determining change in position of said meniscus in response to a change in spacing between adjacent convolutions of said spring.

2. The combination in accordance with claim 1 wherein said convolutions of the coiled spring are provided with opposed substantially flat faces.

3. The combination in accordance with claim 1 wherein said convolutions of the coiled spring have a substantially rectangular cross-section.

4. The combination in accordance with claim 3 wherein said convolutions of the coiled spring are provided with opposed grooved faces for receiving said flexible tube.

5. The combination in accordance with claim 1 wherein said coiled spring is enveloped by a flexible boot for retaining said flexible tube between said convolutions.

6. The combination in accordance with claim 1 wherein said coiled spring is a compression spring.

7. The combination in accordance with claim 1 wherein said flexible tube is transparent.

8. In a band saw including a base means, a support frame means connected to and extending upwardly from said base means, a drive wheel rotatably mounted on said support frame means, a pair of spaced guides on said support frame means, a mounting block slidably mounted between said guides, a coiled compression spring having a plurality of convolutions situated on said support frame and abutting said mounting block, an idler wheel rotatably mounted on said mounting block and substantially coplanar with said drive wheel, an endless band saw blade operably stretched over said drive wheel and said idler wheel, and screw adjustment means threadedly engaging said support frame means and urging said compression spring against said mounting block thereby tensioning said band saw blade, a blade tension indicator means comprising
 a transparent flexible tube closed at one end, situated between adjacent convolutions of said compression spring and in an abutting relationship therewith;
 a liquid in said flexible tube, filling at least a portion of said flexible tube between said convolutions and forming a meniscus; and
 a scale means mounted on said support frame means and adjacent to said meniscus for indicating change in position of said meniscus in response to a change in spacing between adjacent convolutions of said spring as tension of said band saw blade is changed.

9. The blade tension indicator means in accordance with claim 8 wherein said convolutions of the coiled spring have a substantially rectangular cross-section and wherein said coiled spring is enveloped by a flexible boot for retaining said flexible tube between said convolutions.

10. In a spring-actuated weighing device including a base plate, a coiled compression spring having a plurality of convolutions and situated substantially upright on said base plate, and weight-bearing means in abutment with said compression spring and urging said compression spring against said base plate, compression indicator means for said spring comprising a transparent flexible tube closed at one end, situated between adjacent convolutions of said compression spring and in contact therewith; a liquid in said flexible tube, filling at least a portion of said flexible tube between said convolutions and forming a meniscus; and scale means mounted adjacent to said meniscus for indicating change in position of said meniscus in response to a change in spacing between adjacent convolutions of said compression spring.

11. The indicator means in accordance with claim 10 wherein said weight-bearing means comprises a platform means bearing against said compression spring; wherein a portion of said flexible tube is mounted contiguous with said platform; wherein said scale means is mounted on said platform; wherein at least three tubular upstanding guides are provided on said base plate and wherein a corresponding number of downwardly depending leg members are provided on said platform means and are slidably received within said guides.

12. The indicator means in accordance with claim 10 wherein said base plate is provided with a central opening; wherein a housing integral with said base plate substantially envelops said compression spring; wherein said weight bearing means comprises a disk means in abutment with said compression spring and a hook means connected to said disk means, said hook means depending downwardly from said disk means along the longitudinal axis of said compression spring and extending through the central opening in said base plate; wherein a portion of said flexible tube is mounted contiguous with said housing; and wherein said scale means is mounted on said housing.

* * * * *